(12) United States Patent
Reuter

(10) Patent No.: US 12,273,017 B2
(45) Date of Patent: Apr. 8, 2025

(54) LINEAR MOTOR

(71) Applicant: Marco Systemanalyse und Entwicklung GmbH, Dachau (DE)

(72) Inventor: Martin Reuter, Dachau (DE)

(73) Assignee: Marco Systemanalyse und Entwicklung GmbH, Dachau (DE)

( * ) Notice: Subject to any disclaimer, the term of this patent is extended or adjusted under 35 U.S.C. 154(b) by 224 days.

(21) Appl. No.: 17/968,334

(22) Filed: Oct. 18, 2022

(65) Prior Publication Data

US 2023/0132066 A1    Apr. 27, 2023

(30) Foreign Application Priority Data

Oct. 22, 2021 (DE) .......................... 102021127495.8

(51) Int. Cl.
*H02K 9/22* (2006.01)
*H02K 9/19* (2006.01)
*H02K 41/03* (2006.01)

(52) U.S. Cl.
CPC ............... *H02K 9/227* (2021.01); *H02K 9/19* (2013.01); *H02K 41/031* (2013.01)

(58) Field of Classification Search
CPC ........ H02K 41/031; H02K 5/203; H02K 9/19; H02K 9/227
See application file for complete search history.

(56) References Cited

U.S. PATENT DOCUMENTS

| | | | |
|---|---|---|---|
| 5,783,877 A * | 7/1998 | Chitayat | H02K 9/24 310/12.33 |
| 6,717,295 B2 * | 4/2004 | Hwang | H02K 41/031 310/58 |
| 8,154,156 B2 * | 4/2012 | Hsu | H02K 41/03 310/12.22 |
| 2004/0032170 A1 * | 2/2004 | Tamai | H02K 41/03 310/13 |
| 2006/0175907 A1 | 8/2006 | Shikayama et al. | |
| 2007/0257563 A1 * | 11/2007 | Huang | H02K 41/03 310/12.25 |
| 2016/0126800 A1 | 5/2016 | Rusch | |
| 2020/0313487 A1 * | 10/2020 | Foster | H02K 9/223 |

FOREIGN PATENT DOCUMENTS

| | | |
|---|---|---|
| DE | 202013012261 U1 | 11/2015 |
| DE | 102014016171 A1 | 2/2016 |
| DE | 102019200213 A1 | 5/2020 |
| WO | 2009068080 A1 | 6/2009 |
| WO | WO-2017169908 A1 * | 10/2017 ............. H02K 41/02 |

OTHER PUBLICATIONS

WO-2017169908-A1, Usui et al., all pages (Year: 2017).*
German Search Report mailed Jun. 30, 2022 for German Application No. 10 2021 127 495.8, 6 pages.
Translation of Notice of Reasons for Refusal dated Dec. 12, 2020 corresponding to Patent Application No. 2022-168350, 6 pages.

\* cited by examiner

*Primary Examiner* — Naishadh N Desai
(74) *Attorney, Agent, or Firm* — Dickinson Wright PLLC

(57) ABSTRACT

A linear motor comprises a stator having permanent magnets and a rotor that is linearly displaceably arranged in the stator and that includes at least one electric coil. The rotor is provided with a thermally conductive layer that is thermally conductively connected to a liquid-cooled heat sink.

8 Claims, 2 Drawing Sheets

LINEAR MOTOR

Figure 1:
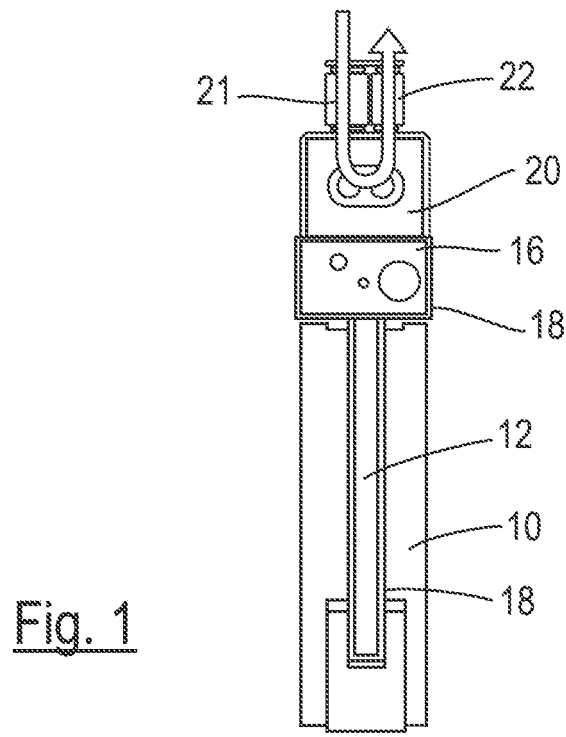

The present invention relates to a linear motor with water cooling, comprising a stator having permanent magnets and a rotor that is linearly displaceably arranged in the stator and that includes at least one electric coil.

Cooled linear motors are known from the prior art. In air-cooled linear motors, air is blown as an air curtain from nozzles into a thin gap between the stator and the rotor in certain applications. However, the small heat capacity of air leads to an ineffective cooling, especially since the amount of air used has to be very large. Furthermore, such a cooling is problematic for applications in a clean room since a transport of liquid droplets can occur here and since a turbulent flow is unwanted in a clean room.

It is therefore the object of the present invention to provide a linear motor that can be used in a clean room and that provides an effective cooling.

This object is satisfied by the features of claim 1 and in particular in that, in a linear motor of the type described above, a thermally conductive layer is provided at the rotor and is thermally conductively connected to a liquid-cooled heat sink.

In accordance with the invention, the cooling of the rotor is not based on heat irradiation, but on heat conduction. For this purpose, the rotor is provided with a thermally conductive layer that leads off heat arising in the rotor to a liquid-cooled heat sink. Since water, for example, has a much greater heat capacity than air with the same volume, the heat sink can, for example, be cooled with water to control the temperature of the rotor.

Advantageous embodiments of the invention are described in the description, in the drawings, and in the dependent claims.

In accordance with a first advantageous embodiment, the thermally conductive layer can be electrically conductive. Such materials usually have a high thermal conductivity and are therefore well suited for leading off heat.

In accordance with a further advantageous embodiment, the thermally conductive layer can be a metal film, in particular a copper film. A stator of the linear motor can be coated over a large area by such a film. The film can have a thickness of less than 0.5 mm, for example 0.2 mm.

In accordance with a further advantageous embodiment, the rotor can be provided with the thermally conductive layer only at one side. To optimize the transfer of heat to the heat sink by means of thermal conduction, in accordance with a further embodiment, the rotor can be enveloped by the thermally conductive layer at at least two sides and in particular at three sides.

In accordance with a further advantageous embodiment, the thermally conductive layer can have slit-like interruptions. This has the advantage that, in the case of an electrically conductive thermally conductive layer, eddy currents are prevented in the thermally conductive layer so that an unwanted braking torque is not exerted on the rotor when it moves.

In accordance with a further advantageous embodiment, the interruptions can at least sectionally extend in parallel and/or in a straight line, which simplifies the manufacture of the linear motor and effectively prevents eddy currents.

In accordance with a further advantageous embodiment, it can be advantageous if the interruptions at least sectionally extend in a meandering manner since a form-fitting adhesive bonding of the thermally conductive layer to the rotor is hereby possible, wherein the separation line between two adjacent regions of the thermally conductive layer, which are separated from one another by the interruptions, is simultaneously increased. A particularly good fastening of the thermally conductive layer to the rotor is hereby achieved since each part section of the thermally conductive layer can be adhesively bonded along a relatively large periphery.

In accordance with a further advantageous embodiment, the rotor can be parallelepiped-shaped and can have two parallel main surfaces and an end face connecting them. The area of this end face is very small compared to the main surfaces so it can be advantageous to have the interruptions at the end face of the parallelepiped extend in a meandering manner to enable a form-fitting adhesive bonding of the partial regions of the thermally conductive layer there.

In accordance with a further advantageous embodiment, the heat sink can be arranged on the rotor so that it is moved along with the rotor.

In accordance with a further advantageous embodiment, the heat sink can be a liquid-cooled cooling block that is in particular in thermally conductive communication with the thermally conductive layer.

The present invention will be described in the following purely by way of example with reference to an advantageous embodiment and to the enclosed drawings.

Figure 2:
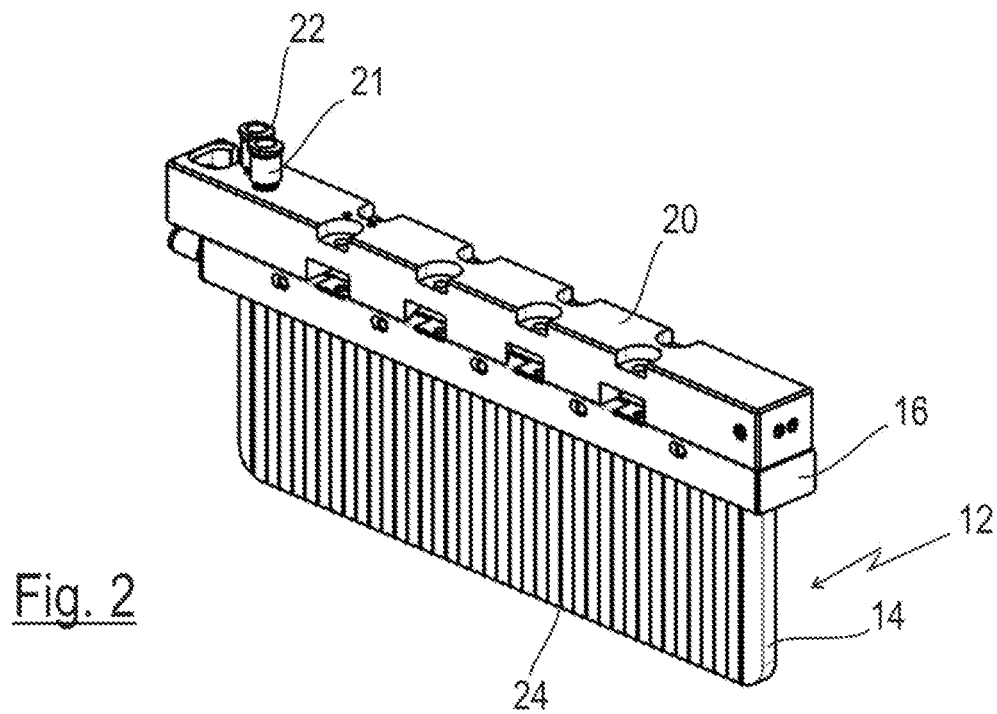
Figure 3:
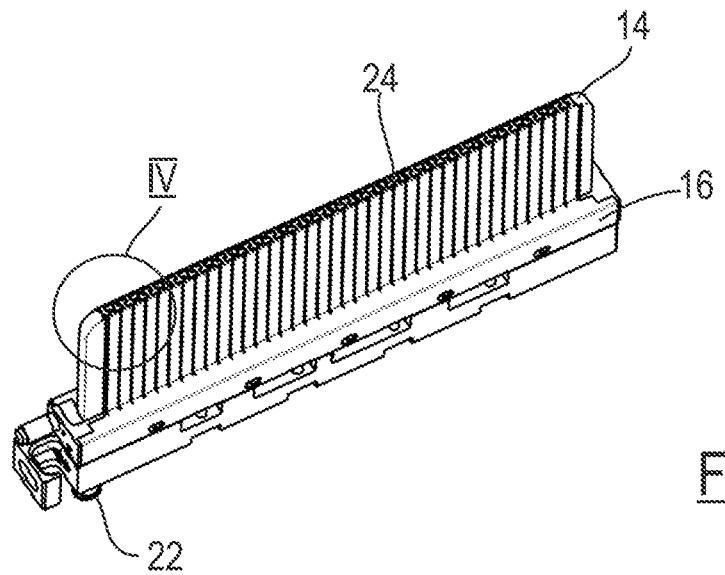

There are shown:

FIG. 1 a schematic side view of a linear motor;

FIG. 2 a perspective view of the rotor of the linear motor of FIG. 1;

FIG. 3 a further perspective view of the rotor of FIG. 2; and

Figure 4:
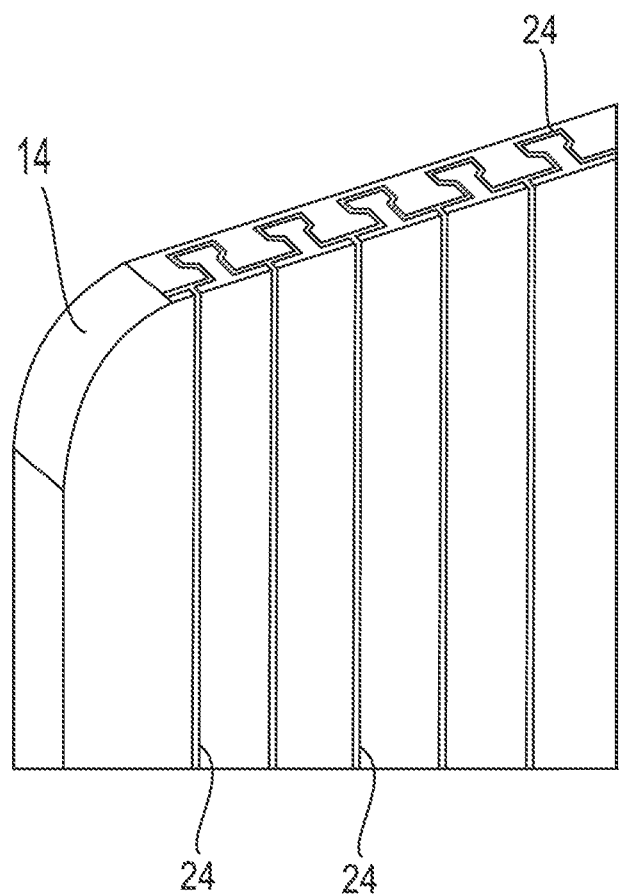

FIG. 4 a greatly enlarged partial view corresponding to the detail IV of FIG. 3.

FIG. 1 shows a schematic side view of a linear motor comprising a stator 10 in which permanent magnets, not shown in more detail, are arranged in a known manner at both sides of a rotor 12. The rotor 12 is linearly displaceable in the stator 10 (perpendicular to the drawing plane) and can be linearly displaced in a known manner by one or more electric coils, which are arranged in the rotor 12, by a suitable energization of the coils.

The rotor 12 is basically of a parallelepiped-shaped design and has two parallel main surfaces and an end face 14 connecting them. Furthermore, the rotor 12 has a terminal block 16 opposite the end face 14, in which terminal block 16 electrical connection lines for the coils are accommodated.

In accordance with the invention, the rotor 12 is provided with a thermally conductive layer 18 that is configured as a thin copper film in the embodiment shown. The rotor 12 is enveloped by the thermally conductive layer 18 both at the two main surfaces and at the lower end surface 14 and the thermally conductive layer 18 furthermore envelops the terminal block 16 and extends up to its upper side. A heat sink 20 is provided at the upper side of the terminal block 16, is liquid-cooled and, in the embodiment shown, is configured as a liquid-cooled cooling block 20. The cooling block 20 has, at its upper side, a supply line 21 and a discharge line 22 for cooling liquid, for example water, and the interior of the cooling block 20 is provided with cooling channels to guide the cooling liquid through the cooling block 20.

As FIG. 1 illustrates, the respective upper end of the thermally conductive layer 18 is clamped between the cooling block 20 and the terminal block 16 so that a good heat transfer can take place between the thermally conductive layer 18 and the cooling block 20.

To prevent eddy currents, the thermally conductive layer 18 has a plurality of slit-like interruptions 24 that are provided at the two main surfaces of the rotor 12 and at its lower end surface 14. At the two main surfaces, the slit-like interruptions 24 divide the thermally conductive layer into strips spaced apart in parallel since the interruptions in this region extend in parallel and in a straight line. At the lower end surface 14 of the rotor 12, the interruptions are, however, of a meandering design (cf. FIG. 4), wherein the thermally conductive layer 18 is adhesively bonded in a form-fitting manner to the rotor 12 in this region.

The invention claimed is:

1. A linear motor with water cooling, the linear motor comprising a stator having permanent magnets and a rotor that is linearly displaceably arranged in the stator and that includes at least one electric coil, wherein the rotor is provided with a thermally conductive layer that is thermally conductively connected to a liquid-cooled heat sink, wherein the thermally conductive layer has slit-like interruptions, wherein the interruptions at least sectionally extend in a meandering manner, wherein the rotor is parallelepiped-shaped and has two parallel main surfaces and an end face connecting them, and wherein the interruptions at the end face of the parallelepiped rotor extend in a meandering manner.

2. The linear motor in accordance with claim 1, wherein the thermally conductive layer is electrically conductive.

3. The linear motor in accordance with claim 1, wherein the thermally conductive layer is a metal film.

4. The linear motor in accordance with claim 3, wherein the metal film is a copper film.

5. The linear motor in accordance with claim 1, wherein the rotor is enveloped by the thermally conductive layer at at least two sides.

6. The linear motor in accordance with claim 1, wherein the interruptions at least sectionally extend in parallel and/or in a straight line.

7. The linear motor in accordance with claim 1, wherein the heat sink is arranged on the rotor.

8. The linear motor in accordance with claim 1, wherein the heat sink is a liquid-cooled cooling block.

* * * * *